April 14, 1970      L. J. AUER      3,506,155
FILLER TUBE CONSTRUCTION FOR GASOLINE TANK
Filed July 5, 1968      2 Sheets-Sheet 1
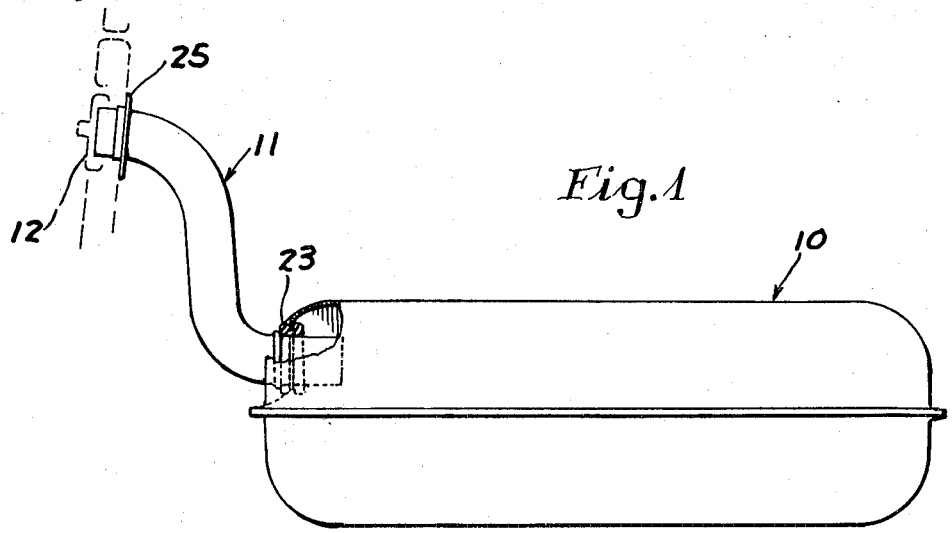
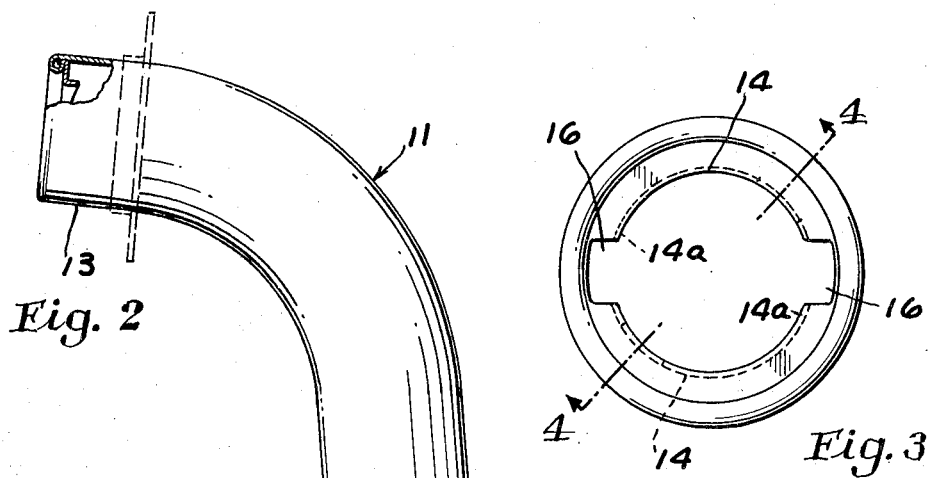
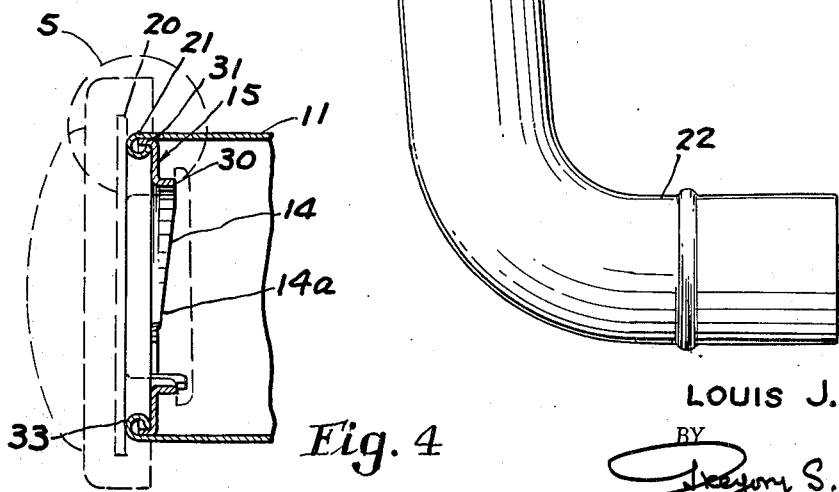
INVENTOR.
LOUIS J. AUER
BY
Gregory S. Dolgorukov
ATTORNEY

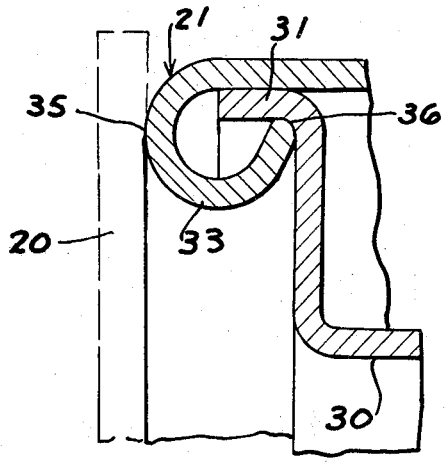
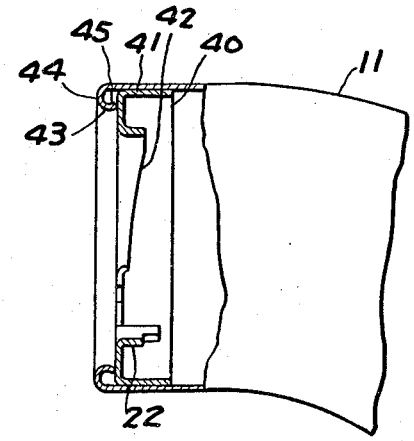
Fig. 5        Fig. 6
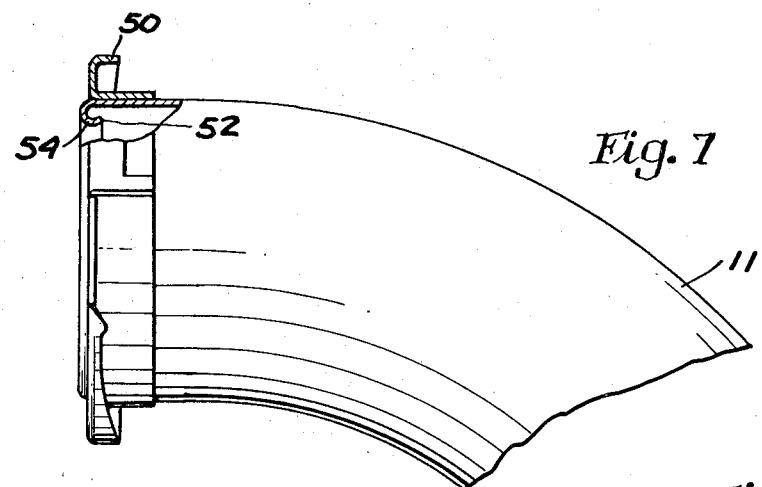
Fig. 7
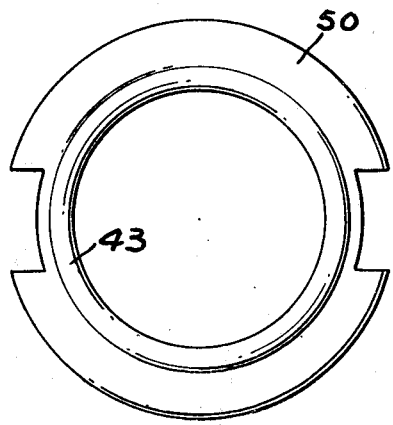
Fig. 8
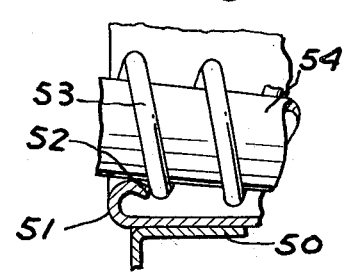
Fig. 9
INVENTOR.
LOUIS J. AUER
BY
Gregory S. Dolgorukov
ATTORNEY

United States Patent Office 3,506,155
Patented Apr. 14, 1970

3,506,155
FILLER TUBE CONSTRUCTION FOR GASOLINE TANK
Louis J. Auer, 1200 E. Square Lake Road,
Bloomfield Hills, Mich. 48013
Filed July 5, 1968, Ser. No. 742,560
Int. Cl. B65b 3/00; B67c 3/00
U.S. Cl. 220—86  2 Claims

ABSTRACT OF THE DISCLOSURE

The specification discloses a tank for inflammable liquids, such as a gasoline tank for a motor vehicle, having filler tube including an improved construction of its upper end receiving the sealing cap. The disclosed construction provides a tight sealing joint between the tube and the cap and eliminates some serious disadvantages of the prior construction. The filler tube end is made in two pieces in order to eliminate the difficulties of producing the desired construction by stamping due to substantial length of the tube. At the same time the disclosed construction eliminates a passage in the juncture of the two pieces leading from the inside of the sealed space within the tube to the outside thereof and some other disadvantages known to have created serious difficulties and having safety implications.

---

This invention relates to tanks for inflammable liquids, such as gasoline tanks for motor vehicles, and particularly to the filler tubes thereof and the separable connection between the sealing cap and the filler tube.

Construction of motor vehicles and location of gasoline tanks therein are such that a gasoline tank has to be provided with a filler tube of considerable length in order to receive conveniently the nozzle of the gasoline hose in filling the tank. In addition, the filler pipe has to go around various body members of the vehicle and, therefore, usually includes one or more bends.

Because of such construction, extreme difficulties have been encountered in forming at the receiving end of the filler tube a joint for engaging the sealing cap. Making such joint requires provision of cams engaging complementary members of the sealing cap to hold the sealing gasket of the cap in sealing contact with the sealing edge of the tube. For a proper construction of the cams and of the sealing cap prongs engaging the same such cams have to be formed on flanges extending inwardly of the tube for a considerable distance with the peripheral edges thereof bent downwardly parallel to the axis of the tube. It was found that forming such flanges involves excessive forming and flowing of the material and that it is not possible to avoid cracks, breaks and wrinkles in such cams if they are formed on a tube, and therefore they cannot be properly formed on a tube having greater length than that making it possible to stamp it from a flat piece.

In order to solve this problem, no such modification of the end of the filler tube body was attempted and the same was left straight. The sealing edge and the cams were formed as a separate piece by stamping operation from a flat piece of sheet metal, with bending the outer peripheral edges of such piece to produce a short tube such as ⅞″ in length. Upon completion, such piece, usually termed the cam tube, was secured to the end of the filler tube. Such cam tube being of slightly larger diameter than the end of the tube is forced fit over the end of the filler tube and sealed thereto permanently by soldering, usually in the process of tinning the entire tube.

Such connection avoids spot welding of the cam tube to the filler tube, which operation is undesirable since it produces oxidized spots to which the solder may not adhere properly. However, since the filler tube is made from a longitudinally welded pipe, this difficulty was not solved fully and voids in the sealing solder at the place of the welded joint often occur and make it necessary to inspect and in many cases to repair such filler tubes to eliminate imperfection in the joints. Such inspection adds considerably to the cost of production.

It should be also understood that with such a construction there was a path from the inside of the filler tube to the outside thereof between the end of the filler tube and the cam tube, bypassing the sealed joint. Therefore, difficulties in sealing properly such annular path with the solder presented serious disadvantages of such filler tubes, and have been found to give rise to serious problems having safety implications and requiring immediate improvement. It was also found that the soldered joint so produced did not have sufficient strength and could break in the case of an accident or a severe jolt, making it possible for the cam tube to fall off with the sealing cap still connected to it, leaving the end of the filler tube open with the gasoline pouring out therefrom, presenting a serious danger of fire with resulting loss of life or painful injuries. With the safety of motor vehicle constructions being now in the public eye, such a defect in construction has become very objectionable.

One of the objects of the present invention is to provide an improved construction of the filler tube whereby the above difficulties and disadvantages are overcome and largely eliminated, producing a more reliable construction.

Another object of the invention is to provide an improved construction of the filler tube which makes it possible to produce the sealing edges directly on the tube, which tube has a greater length than the length permitting making such tube by stamping operations from a flat piece and drawing downwardly the outer peripheral edges of the tube.

A still another object of the invention is to provide an improved construction of the filler tube having a sealing edge which is susceptible of being made directly on the tube and the cams made on a separate flat piece by stamping operations without such operations being adversely affected by the length and the bends in the tube.

A further object of the invention is to provide an improved construction of the above nature in which the cam plate is made as a separate piece and thereupon connected to the end of the filler tube to form a unitary structure therewith without the necessiy of soldering, spot welding, or use of rivets and similar mechanical connections.

A still further object of the invention is to provide a construction of the above character in which the cam plate is secured to the receiving end of the filler tube without forming thereat a passage from the inside of the tube to the outside thereof sealing of which presents difficulties.

A still further object of the present invention is to provide an improved construction of the foregoing nature in which connection of the cam plate to the receiving end of the filler tube is made by stamping operations without encountering the difficulties explained above.

A still further object of the present invention is to provide a two-piece construction of the above nature connected together to form a unitary structure, with the sealing edge being formed by the edges of the body of the filler tube, thus making it possible to provide the cams either on the inside or on the outside of the tube without forming any passages bypassing the seal between the gasket of the cap and the sealing edge of the filler tube.

A still further object of the invention is to provide an improved filler tube for a motor vehicle gasoline tank, said filler tube having its sealing cap engaging cams provided on the outside thereof and thus made ineffective for use as gasoline hose nozzle retaining means, improved means being provided to retain the nozzle at the receiving end of the filler tube in filling the tank.

It is a further object of the invention to provide a construction of the foregoing nature in which a rounded sealing edge is formed by the edges of the receiving end of the tube body, which edge performs the double function of providing a seal and holding the cam plate securely in place; or providing such seal and nozzle retaining means.

A still further object of this invention is to provide a filler tube with sealing cap which prevents volatile liquid vapour from escaping through the joint and causing various problems.

A still further object of the present invention is to produce a tank for inflammable liquid having a filler tube of the above-described nature which is simple in construction, safe and dependable in operation, and which is relatively inexpensive to manufacture.

Further objects and advantages of this invention will be apparent from the following description and appended claims, reference being had to the accompanying drawings forming a part of this specification, wherein like reference characters designate corresponding parts in the several views.

FIGURE 1 is an elevational view of an automobile gasoline tank including a filter tube embodying the present invention.

FIGURE 2 is an elevational view of the filler tube of FIGURE 1, shown separately on an enlarged scale with its cap removed and with a portion of its upper end broken away to show construction thereof.

FIGURE 3 is a view of the upper end of the filler tube with the observers presumed to look perpendicularly to the plane thereof.

FIGURE 4 is a fragmentary sectional view taken in the direction of the arrows on the section plane passed through line 4—4 of FIGURE 3, with the sealing cap being indicated in phantom lines place on the tube.

FIGURE 5 is a view on an enlarged scale of the portion of FIGURE 4 encircled on said figure with a circle designated with the numeral 5 and showing connection of the inner piece or cam plate to the edges of the upper end of the tube.

FIGURE 6 is a view similar in part to FIGURE 4 showing a modified construction of the filler tube.

FIGURE 7 is a view similar in part to FIGS. 4 and 6, but showing a further modification of the filler tube construction.

FIGURE 8 is a view similar in part to FIGURE 3 but showing the construction of the upper end of the tube of FIGURE 7.

FIGURE 9 is a fragmentary view, partly in section, illustrating the operation of a sealing edge of the construction of FIGS. 7 and 8 as nozzle-retaining means when filling the tank.

In the drawings there is shown, by way of example, a gasoline tank for a motor vehicle, embodying the present invention. Referring specifically to FIGURES 1–5 illustrating the preferred embodiment of the invention, the tank illustrated therein comprises a gasoline receptacle generally designated by the numeral 10, and a filler tube 11 connected to said receptacle and which tube is adapted to receive a sealing cap 12. The receptacle 10 of the tank construction may be of any suitable character. The receptacle by itself does not form a part of the present invention and, therefore, need not be described in further details. The sealing cap 12, which may also be of a conventional construction, is adapted to engage the upper end 13 of the filler tube for sealing the same.

The engagement is effected with the aid of a connection known in the art under the term of "bayonet joint" and includes hook-type prongs on the cap and cams on the upper end of the sealing tube. The cams are in the form of sheet metal portions 14 of the cam plate 15. In connecting the sealing cap to the filler tube, the hook-type prongs of the sealing cap are passed through recesses 16, 16 of the upper end of the tube, see FIGURE 3, adjacent the lower points 14a of the cams 14. Rotation of the cap causes the hook-type prongs to follow the inclined cams 14 thus pulling the sealing cap and the gasket 20 thereof against the sealing edge 21.

The construction so far described in general terms is a conventional one. The lower end 22 of the filler tube 11 is connected to the receptacle 10 by a resilient joint including a resilient gasket 23 made preferably of a suitable rubber-like material. The filler tube 11 is of considerable length such as 12 inches and even more and, therefore possesses considerable leverage. Therefore, pressure on the upper end 13 of the tube 11 would produce considerable strain at the place of juncture between the lower end 22 of the tube and the receptacle 10. In case of vibrations, intermittent pressure at such juncture would endanger a rigid joint. It is for this reason that resilient joint is used. In addition, in order to decrease the effect of undesirable leverage possessed by the tube 11 in case of pressure or vibrations, the upper end thereof is connected to the vehicle structure as indicated at 25.

It will now be seen in view of the foregoing that the separable sealing connection at the upper end of the filler tube comprises two main functional portions, namely sealing means including a smooth sealing edge on the tube and a gasket carried by the cap and contacting said edges, and holding means in the form of the bayonet joint adapted to hold the cap and press the resilient gasket thereof against the sealing edge of the tube.

As mentioned above, the tube 11 is of a curvilinear outline having two bends in order to provide for convenient reaching of its receiving end with the end of a gasoline hose. Because of substantial length of the tube and curvature thereof, it was found impracticable to form the sealing edge and the cams as an integral part of the upper edge of the tube. It was found necessary to make such edge and cams as parts of a separate piece by stamping operations from a flat piece and thereupon connect such piece to the uper end of the filler tube to form a unitary structure. Heretofore, such separate piece was made in the form of a very short and straight cam tube approximately ⅞″ in length with its inside diameter slightly larger than the outside diameter of the end of the filler tube. The upper edge of such cam tube was formed by stamping operations to provide thereon both the sealing edge and the cams. Thereupon, such cam tube was slipped on the straight end of the filler tube and soldered thereon.

It is important to understand at this point that with such a construction the rounded sealing edge contacting the gasket of the sealing cap was formed on the cam tube or plate while the end edge of the upper end of the filler tube was left straight. Because of such a construction, a permanent joint between the cam tube and the end of the filler tube was formed and it required safe and effective sealing. It was attempted to produce such sealed permanent joint by soldering, bringing about the disadvantages explained above.

I have discarded such construction as leading to serious difficulties. In accordance with the present invention, the rounded sealing edge is formed on the body edge of the filler tube, while the cam plate having cams formed thereon and made separately is connected to the filler tube either on the inside or the outside thereof. Since only rounded sealing edge is made on the filler tube and no cams, forming such rounded edge on the tube became possible. By virtue of such a construction, no joint is formed in the filler tube, and it becomes immaterial whether the cam-carrying piece, a cam plate in the present embodiment, is secured to the upper end of the filler tube on the inside or the outside thereof.

In accordance with the present invention, the cam plate comprises an annular piece 15, the inner edges 30 whereof directed toward the lower end 22 of the tube are stamped to form the cams 14. The upstanding peripheral flanges 31 of the plate 15 are directed toward the sealing cap and are made to fit into the inside of the filler tube at the end edges thereof, and are held in place thereat by bending the upper edge 33 of the tube 11 to form a circular curved edge of a substantially circular cross section, with its extremity tightly bearing on the flanges 31, as shown at 36, and thus forming a unitary construction. The inner tube and the cam plate are then tinned, and the joint becomes gas tight and permanent. The cam plate 15 is made by stamping from a flat piece as in prior constructions, but since no sealing edge or tubular body need to be formed thereon, the stamping operations are greatly simplified.

It will now be understood in view of the foregoing that should there be any imperfection in the joint between the flanges 31 and the edges 33 or any other portion of the filler tube 11, this would in no way endanger the tightness of the sealing joint since such imperfection would be within the space fully sealed along the circular line 35 between the upper portion of the rounded edge 33 and the gasket 20 of the sealing cap, see FIGURE 5. Such a construction does not require any spot welding or connections such as rivets, screws, and the like, thus avoiding difficulties explained above.

As mentioned, with such a construction it is immaterial whether the cam plate is secured to the filler pipe inside or outside thereof. In either case the sealing is inherently gas-tight and perfect.

FIGURE 6 shows a modified construction in which the cam plate 40 is secured on the inside of the tube 11 at its outer peripheral flanges 41 directed toward the lower end of the tube while the cams are formed on the inner flanges 42 also directed toward the lower end of the tube. The upper edge 43 bent inwardly of the tube provides rounded sealing edge at their portions 44 and hold with their extremities 45 bearing on the cam plate 40 thus forming a stop therefor and preventing movement of the cam plate outwardly of the tube 11. In manufacturing, such cam plate is first force-fit in the filler tube 11, and the edges of the tube are bent inwardly against said plate 40. The tube then may be tinned, fixing the cam plate 40 in place still more securely and forming a unitary construction.

It will now be understood in view of the foregoing that by virtue of such a construction the tinned joint in this connection is sufficient, since in case of an accident or severe impact the sealing cap connected to the cam plate 40 cannot separate as could happen in the prior construction in which the cam tube was held at the end of the tube by a soldered joint only. In my improved construction, the joint is greatly reinforced by the bent edges 43 which would have to be unbent fully in order to permit the cam plate connected to the sealing cap to separate from the tube.

FIGURE 7 shows a second modification in which the cams are formed on a cam plate 50 secured to the tube on the outside thereof. In such a construction the seal between the filler tube 11 and the sealing cap is also gas-tight and perfect. However, the mechanical connection between the cam plate 50 and the upper end of the tube 11 is less secure than in the constructions of FIGURES 1–5 or FIGURE 6, and an additional reinforcement therefor may be provided, if desired.

Provision of the cam plate 50 and, therefore, of the cams carried thereby, on the outside rather than on the inside of the filler tube 11 makes said cams ineffective or unavailable for the purpose of retaining the nozzle of the gasoline hose in filling the tank. In accordance with the invention, the rounded sealing edge 51 is made without the necessity of any extra parts, to perform the additional function of nozzle retaining means. For ensuring proper performance of such function, the edge 51 is bent upon itself for slightly in excess of 180 degrees, and thus to provide a sharp edge 52 adapted to engage the member 53 wound on the nozzle 54 for such purpose, and to retain the nozzle in place in filling the tank.

Although the present invention has been illustrated and described herein with reference to a gasoline tank of a motor vehicle, it will be understood that the invention is not limited to such application but may be used with success in other applications both in motor vehicles and in other constructions. For instance, it may be applied successfully to oil filler tubes of motor vehicle engines. Also, the improved construction disclosed herein may be applied to portable or stationary tanks or receptacles carrying inflammable liquids other than gasoline, or non-flammable liquids or gases where reliable sealing is of importance. In some such constructions the tube need not be necessarily a filler tube but may have different function and designation.

By virtue of the above-disclosed constructions, the objects of the present invention listed above and numerous additional advantages are attained.

I claim:

1. In a gasoline tank for a motor vehicle, a filler tube having a lower end attached to the tank and an open upper end adapted to receive a closing cap with a sealing gasket, said upper end including a smooth rounded sealing edge and cam means adapted to be engaged by complementary hook flange means provided on the closing cap and adapted to draw the sealing gasket into sealing contact with said sealing edge and to hold it thereat, said sealing edge being in the form of an annular curl formed integrally with the body of the filler tube at the extremity of the upper edge thereof by bending the originally straight annular edge thereof inwardly of the tube, with the cam means being in the form of an annular plate having cams formed in its central portion and an upstanding peripheral flange fitted into the tube at the upper end thereof with the extreme edge of the curl rolled against said flange to exert locking pressure on it transversely of the tube walls.

2. In a gasoline tank for a motor vehicle, a filler tube having a lower end attached to the tank and an open upper end adapted to receive a closing cap with a sealing gasket, said upper end including a single smooth rounded sealing edge and cam means adapted to be engaged by complementary hook flange means carried by the closing cap and adapted to draw the sealing gasket into sealing contact with said sealing edge and to hold it thereat, said sealing edge being in the form of an annular curl of a near-circular cross section and integral with the walls of the tube, and a cam plate having a horizontal portion with peripheral flanges and fitted into the tube with said peripheral flanges against the walls of the tube, with the extremities of the curl rolled to extend locking pressure on said flanges transversely thereof.

References Cited

UNITED STATES PATENTS

| 2,652,945 | 9/1953 | Walker | 220—40 |
| 3,133,564 | 5/1964 | Hunter | 220—86 X |
| 3,358,876 | 12/1967 | Joosten et al. | 220—67 |

RAPHAEL H. SCHWARTZ, Primary Examiner